(12) United States Patent
Braun et al.

(10) Patent No.: US 9,933,519 B2
(45) Date of Patent: Apr. 3, 2018

(54) THREE DIMENSIONAL RADAR SYSTEM

(71) Applicant: ELBIT SYSTEMS LTD., Haifa (IL)

(72) Inventors: Hans Martin Braun, Salem (DE);
Gadi Maydan, Pardesiya (IL); Holger Baessler, Balingen (DE); Carston Jonas, Markdorf (DE); Ofer Klein, Tel Aviv (IL)

(73) Assignee: Elbit Systems Ltd., Haifa (IL)

( * ) Notice: Subject to any disclaimer, the term of this patent is extended or adjusted under 35 U.S.C. 154(b) by 270 days.

(21) Appl. No.: 14/658,619

(22) Filed: Mar. 16, 2015

(65) Prior Publication Data

US 2015/0185317 A1 Jul. 2, 2015

Related U.S. Application Data

(63) Continuation-in-part of application No. 13/580,418, filed as application No. PCT/IB2011/050650 on Feb. 16, 2011, now Pat. No. 8,981,990.

(Continued)

(51) Int. Cl.
| | |
|---|---|
| *G01S 13/02* | (2006.01) |
| *G01S 13/89* | (2006.01) |
| *G01S 13/94* | (2006.01) |
| *G01S 7/298* | (2006.01) |
| *G01S 13/524* | (2006.01) |

(Continued)

(52) U.S. Cl.
CPC ............. *G01S 13/89* (2013.01); *G01S 7/298* (2013.01); *G01S 13/5242* (2013.01); *G01S 13/9023* (2013.01); *G01S 13/94* (2013.01); *G01S 7/2806* (2013.01); *G01S 2007/027* (2013.01); *G01S 2013/9082* (2013.01)

(58) Field of Classification Search
CPC .. G01S 13/5242; G01S 13/89; G01S 13/9023; G01S 13/94; G01S 2007/027; G01S 2013/9082; G01S 7/2806; G01S 7/298
See application file for complete search history.

(56) References Cited

U.S. PATENT DOCUMENTS

| | | | |
|---|---|---|---|
| 6,549,159 B1 | 4/2003 | Wolframm et al. | |
| 8,981,990 B2 * | 3/2015 | Braun | G01S 13/89 342/156 |

(Continued)

OTHER PUBLICATIONS

International Search Report of International Application No. PCT/IB2011/050650 dated Jun. 90, 2011.

(Continued)

*Primary Examiner* — Timothy A Brainard
(74) *Attorney, Agent, or Firm* — Pearl Cohen Zedek Latzer Baratz LLP

(57) ABSTRACT

A system and a method of generating a three-dimensional terrain model using one-dimensional interferometry of a rotating radar unit is provided herein. Height information is evaluated from phase differences between two echoes by applying a Kalman filter in relation to a phase confidence map that is generated from phase forward projections relating to formerly analyzed phase data. The radar system starts from a flat earth model and gathers height information of the actual terrain as the platform approaches it. Height ambiguities are corrected by removing redundant $2\pi$ multiples from the unwrapped phase difference between the echoes.

20 Claims, 8 Drawing Sheets

Related U.S. Application Data

(60) Provisional application No. 61/306,566, filed on Feb. 22, 2010.

(51) Int. Cl.
*G01S 13/90* (2006.01)
*G01S 7/28* (2006.01)
*G01S 7/02* (2006.01)

(56) References Cited

U.S. PATENT DOCUMENTS

| | | |
|---|---|---|
| 2004/0178943 A1 | 9/2004 | Niv |
| 2005/0128126 A1 | 6/2005 | Wolframm et al. |
| 2005/0231420 A1 | 10/2005 | Brookner et al. |
| 2005/0283328 A1* | 12/2005 | Tashev ............. G01S 7/00 702/94 |
| 2013/0300573 A1* | 11/2013 | Brown ............ A61B 5/1113 340/870.01 |

OTHER PUBLICATIONS

Notice of Allowance of U.S. Appl. No. 13/580,418 dated Nov. 7, 2014.

\* cited by examiner

THREE DIMENSIONAL RADAR SYSTEM

CROSS REFERENCE TO RELATED APPLICATIONS

This application is a continuation-in-part of U.S. patent application Ser. No. 13/580,418, filed on Dec. 10, 2012, which is a National Phase Application of PCT International Application No. PCT/IB2011/050650, International Filing Date Feb. 16, 2011, entitled: "THREE DIMENSIONAL RADAR SYSTEM", published on Aug. 25, 2011 as International Publication No. WO 2011/101794, claiming the benefit of U.S. Provisional Patent Application No. 61/306,566, filed on Feb. 22, 2010, all of which are incorporated herein by reference in their entirety.

FIELD OF THE INVENTION

The present invention relates to the field of radar, and more particularly, to interferometric methods using same.

BACKGROUND OF THE INVENTION

Using radar for three-dimensional (3D) mapping is advantageous in many applications in poor visibility conditions, such as harsh weather, limited light, underwater environments and the like. For example, there is a need for a Helicopter Flight and Landing Radar (Heli-FLR) to assist pilots in avoiding potential hazards for helicopter safety during flight phase (such as terrain, antennas, trees and power transmission wires), in various weather conditions during day and night, and, furthermore to provide near-real time information of the landing area (such as obstacles, inclined terrain, holes) during the landing phase. A similar need exists in neighboring applications such as mapping obstacles for submarines and remotely piloted aircrafts (RPA).

U.S. Patent Application Publications Nos. 2005/128126 and 2004/178943, as well as U.S. Pat. No. 6,549,159, disclose relevant prior art information regarding various radar system. In particular, US 2005/128126 discloses a radar system mounted on a helicopter's rotating cross (RO-SAR—rotor mounted synthetic aperture radar), US 2004/178943 discloses a non-scanning system utilizing Doppler shifts, and U.S. Pat. No. 6,549,159 discloses another ROSAR system.

SUMMARY OF THE INVENTION

Some embodiments of the present invention provide a radar system comprising a radar unit arranged to rotate around a rotation axis in respect to a moving platform and a processor connected to the receiver antennas. The radar unit comprises a transmitter antenna arranged to transmit, cyclically around the rotation axis and sequentially such as to cover a 360° azimuth angle around the rotation axis, a plurality of radar signals, each having a spatial angle comprising a range of off-axis angles and a range of azimuth angles; and a first and a second receiver antennas separated along the rotation axis, and arranged to receive, for substantially each radar signal a first and a second echo, respectively. The processor is arranged to: co-register the second echo in relation to positional data of the platform; generate an interferogram of the first echo and the co-registered second echo; apply a Kalman filter to the interferogram in relation to a phase confidence map such as to calculate an unwrapped phase difference between the first and the second echo; calculate an off-axis angle from the unwrapped phase; derive, from the calculated off-axis angle, height information associated with the corresponding spatial angle of the radar signal; calculate, from the off-axis angle, a phase forward projection; and update the phase confidence map with the phase forward projection. The processor is arranged to initially generate the phase confidence map for each spatial angle from a specified surface model, and sequentially update the phase confidence map every cycle in relation to the current cycle phase forward projection and to phase forward projections of former cycles, relating to the radar signals of each spatial angle, and considering the platform movement from cycle to cycle.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

The present invention will be more readily understood from the detailed description of embodiments thereof made in conjunction with the accompanying drawings of which.

DETAILED DESCRIPTION OF THE INVENTION

Figure 1:
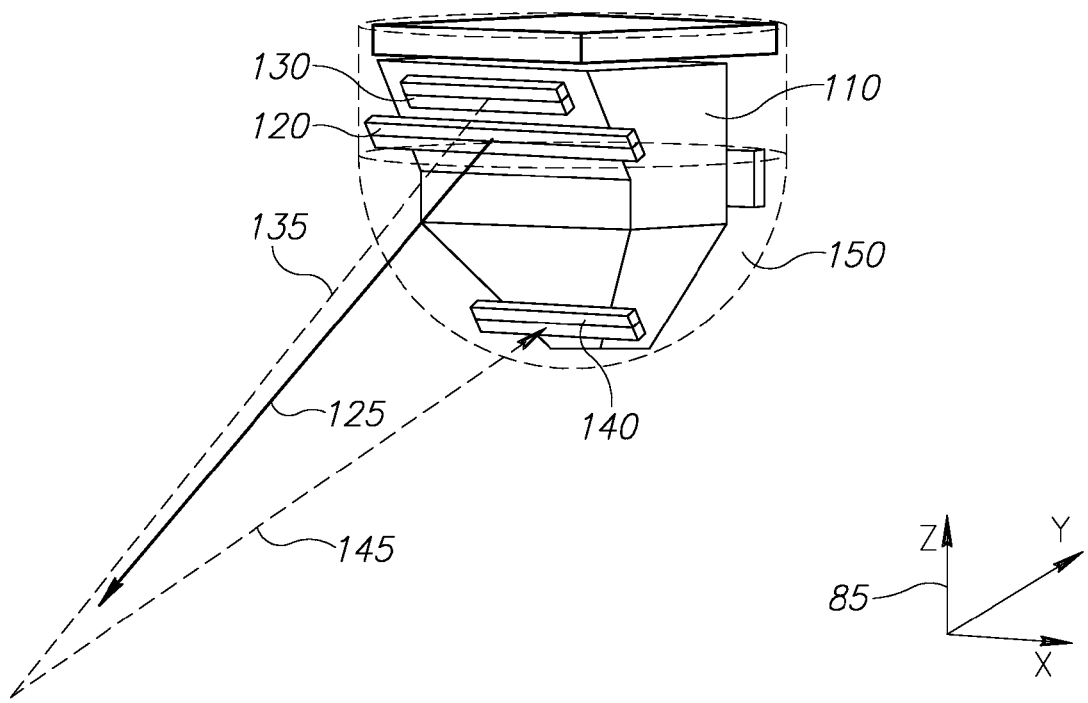
FIG. 1 is a high level schematic illustration of a radar sensor, according to some embodiments of the invention.

Before at least one embodiment of the invention is explained in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

For a better understanding of the invention, the usages of the following terms in the present disclosure are defined in a non-limiting manner:

The term "nadir" as used herein in this application, is defined as the direction pointing directly below a particular location; that is, the direction opposite to the zenith.

The term "off-nadir" as used herein in this application, is defined as the angle a line to a certain point forms to the nadir.

FIG. 1 is a high level schematic illustration of a radar sensor 100, according to some embodiments of the invention. Radar sensor 100 may comprise a radar electronics unit 110 mounted below a flying platform (not shown, e.g., a helicopter) rotating around the Z axis 85. Three antennas are attached to electronics unit 110. A transmitter 120 is arranged to transmit a signal 125 to ground and the other two—a first receiver sensor 130 and a second receiver sensor 140, separated vertically in different height positions, are arranged to receive echoes 135, 145 (respectively) from the ground. These two receiving channels are processed interferometrically for evaluation of the elevation angle of the incoming echoes and hence determination of the position of the reflection point on ground. The rotation time may comprise about 2 seconds allowing a highly dynamic update of the three dimensional terrain model.

In some embodiments, a one dimensional (1D) interferometric Radar algorithm for generating a three dimensional (3D) model of the landscape beneath a flying platform (e.g., a Helicopter) is provided. Radar 100 comprises transmitter antenna 120 and two receiver antennas 130, 140 that are separated in height, along the rotation axis 85 (e.g., vertically when the rotation axis is the z axis). All antennas 120, 130, 140 are looking down at an angle to the ground and are rotating 360° around the z axis, at a specified speed selected to cover the entire area beneath the platform within a specified short time. Antennas 120, 130, 140 may comprise fan beams with small beams, e.g., smaller than 5 degrees in azimuth and wide beams, e.g., larger than 50 degrees in elevation, for covering a large area during each rotational scan. Radar signals 125 are transmitted towards the ground, reflected from landscape and obstacles (135, 145) and are received in parallel by both receiver antennas 130, 140. The phases of the two received signal chains 135, 145 are processed by interferometric methods in order to derive the vertical (off-nadir) angle to a reflector on ground and allowing estimate its height to be estimated. The distance of the reflector to radar 100 is measured by the round trip delay time and the azimuth position according to the pointing direction of antennas 120, 130, 140.

Radar sensor 100 may be housed in a RADOM 150 (a radar-transparent covering dome), e.g., having a half spherical form.

Radar sensor 100 may comprise a transmit-receive switch (e.g., a circulator) connecting one of receiving antennas 130, 140 with transmitter antenna 120 for routing transmitted pulse 125 to transmitter antenna 120 and the corresponding one of received echoes 135, 145 from the corresponding one of receiving antennas 130, 140.

Transmitter antenna 120 may be positioned between receiver antennas 130, 140 as illustrated in FIG. 1, or aside from receiver antennas 130, 140, to minimize a separation distance between the first and the second receiver antennas. Transmitter antenna 120 may be a long transmitter antenna with a small azimuth beamwidth and may be located close to the upper end (mounting point of the flying platform). For example, transmitter antenna 120 may be 1.5 to 2 times longer and with a smaller azimuth beamwidth in respect to receiver antennas 130, 140. Receiver antennas 130, 140 may be smaller with a larger azimuth beamwidth. One of receiver antennas 130, 140 may be located at the lower position of the rotating sensor 100 such as to minimize the volume of the required spherical RADOM 150. The azimuth resolution may result from the two-way beamwidth of the combined transmitter 120 and receiver 130, 140 antennas.

Figure 2:
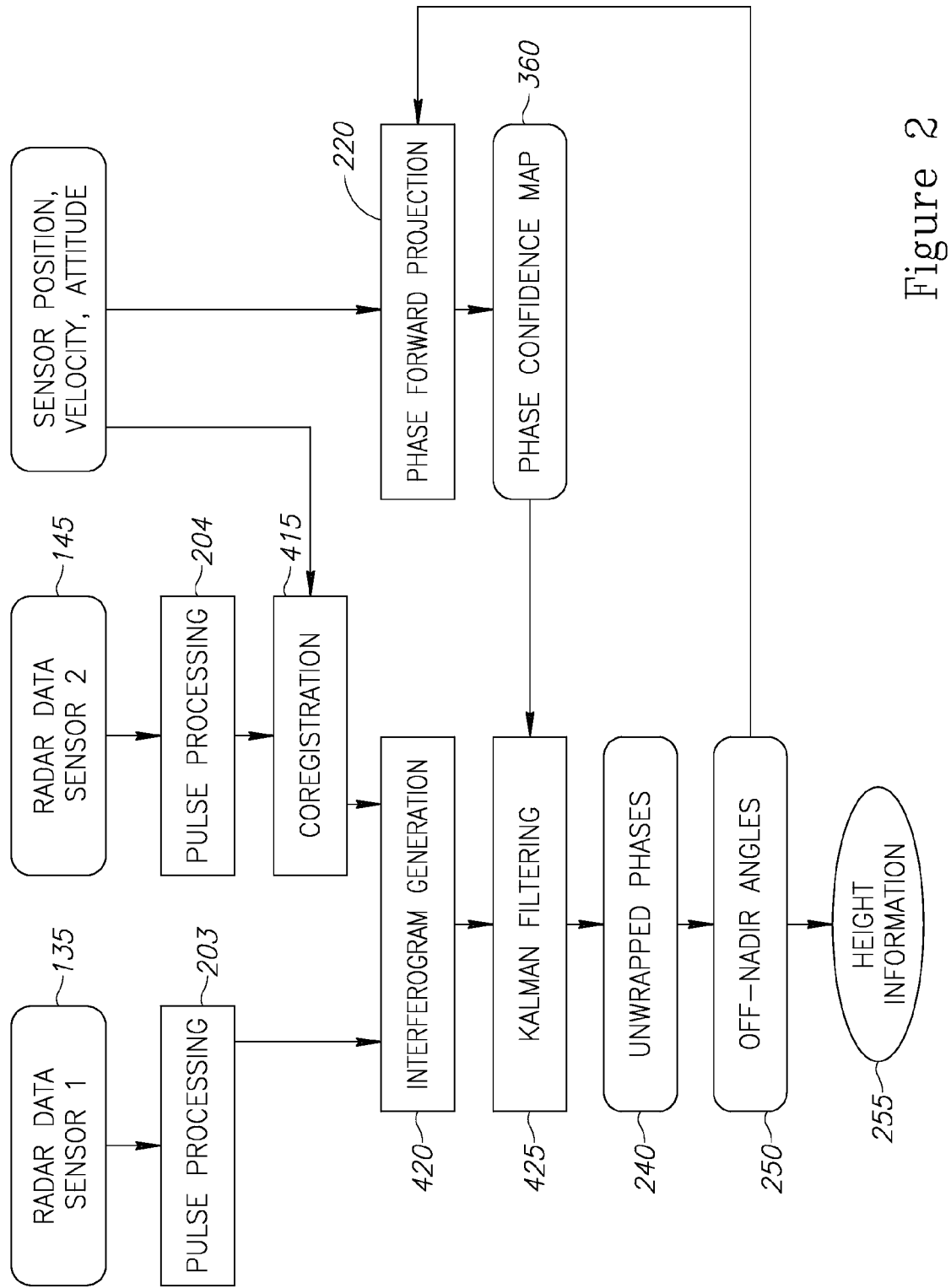
FIG. 2 is a high level flowchart illustrating the logical flow of the interferometry algorithm, according to some embodiments of the invention.

FIG. 2 is a high level flowchart illustrating the logical flow of the interferometry algorithm, according to some embodiments of the invention.

In a first step, the radar data of both sensors are pulse compressed 203, 204. Then, the pulse-compressed data of second sensor 140 is co-registered 415 to the data of first sensor 130. Because of the geometry, the resolution and the small baseline, difference between both data sets is very limited. Nevertheless, co-registration 415 is performed in order to reduce phase errors and is realized by multiplying second signal 145 with a phase shift:

$$\varphi = e^{-2\pi j \cdot \Delta f \cdot t_{shift}} \qquad \text{Equation 1}$$

in frequency domain, where $t_{shift}$ represents the time difference between both received data with respect to sensor positions and flat earth geometry.

After co registration, multiplying first signal 135 with the complex conjugated of second signal 145 is used to generate the interferogram (stage 420).

In a pre-processing step, phase gradients are estimated out of the interferogram and serve as driving model for the Kalman filter process (stage 425). For single pass interferometry the height error $\sigma_z$ depends on the phase noise $\sigma_\varphi$, wavelength $\lambda$, distance R, look angle $\Theta$ and the perpendicular baseline length $B_{perp}$ according to:

$$\sigma_z = \frac{\lambda \cdot R \cdot \sin(\Theta)}{2 \cdot \pi \cdot B_{perp}} \cdot \sigma_\phi \qquad \text{Equation 2}$$

The maximum detectable height difference (Height of Ambiguity) can be calculated from equation 2 by setting $\sigma_\varphi = 2\pi$. After sampling of the Radar signals, the maximum allowed phase differences from one range cell to the other due to changes in topography (FIG. 3) can be expressed as:

$$\Delta \phi_A = 2 \cdot \pi \cdot \frac{R_{A2} - R_{A1}}{\lambda} \qquad \text{Equation 3}$$

$$\Delta \phi_B = 2 \cdot \pi \cdot \frac{R_{B2} - R_{B1}}{\lambda}$$

$$|\Delta \phi_A - \Delta \phi_B| < \pi$$

The Tx path is identical (one separate Tx antenna 120). $R_{A1}$ and $R_{A2}$ are the distances from a point A to the receiving antennas Rx1 130 and Rx2 140. $R_{B1}$ and $R_{B2}$ are the distances from a point B that is located in an adjacent range cell. To be able to unwrap the phases unambiguous, the magnitude of the phase difference introduced by the topography has to be less than $\pi$. Due to the extreme near field geometry, high and steep objects 80 (FIG. 3) lead to height-ambiguity problems ($2\pi$ jumps). To overcome this problem, a phase confidence map (360) is generated by forward projection (stage 220) of old measured data and current platform-position, velocity and attitude data. This phase confidence map (360) is used as an input of the Kalman filtering (425).

The result of the Kalman filtering 425 is the unwrapped phases 240. Finally, off-nadir angles 250 can be calculated. On one hand, they are used to estimate the appropriate height information (255), and on the other hand, they serve as input to the phase forward projection (220) to compute the phase confidence map (360).

The distance between the receiver antennas 130, 140 may be selected according to a relation between expected motion characteristics of the moving platform and an expected topographical variability of the height information. For example, the distance may be adapted to a scenario of an helicopter flying above an urban landscape, with the corresponding flight characteristics (e.g., flight height) and topographical characteristics of the landscape (e.g. height and spacing between the buildings).

Figure 4:
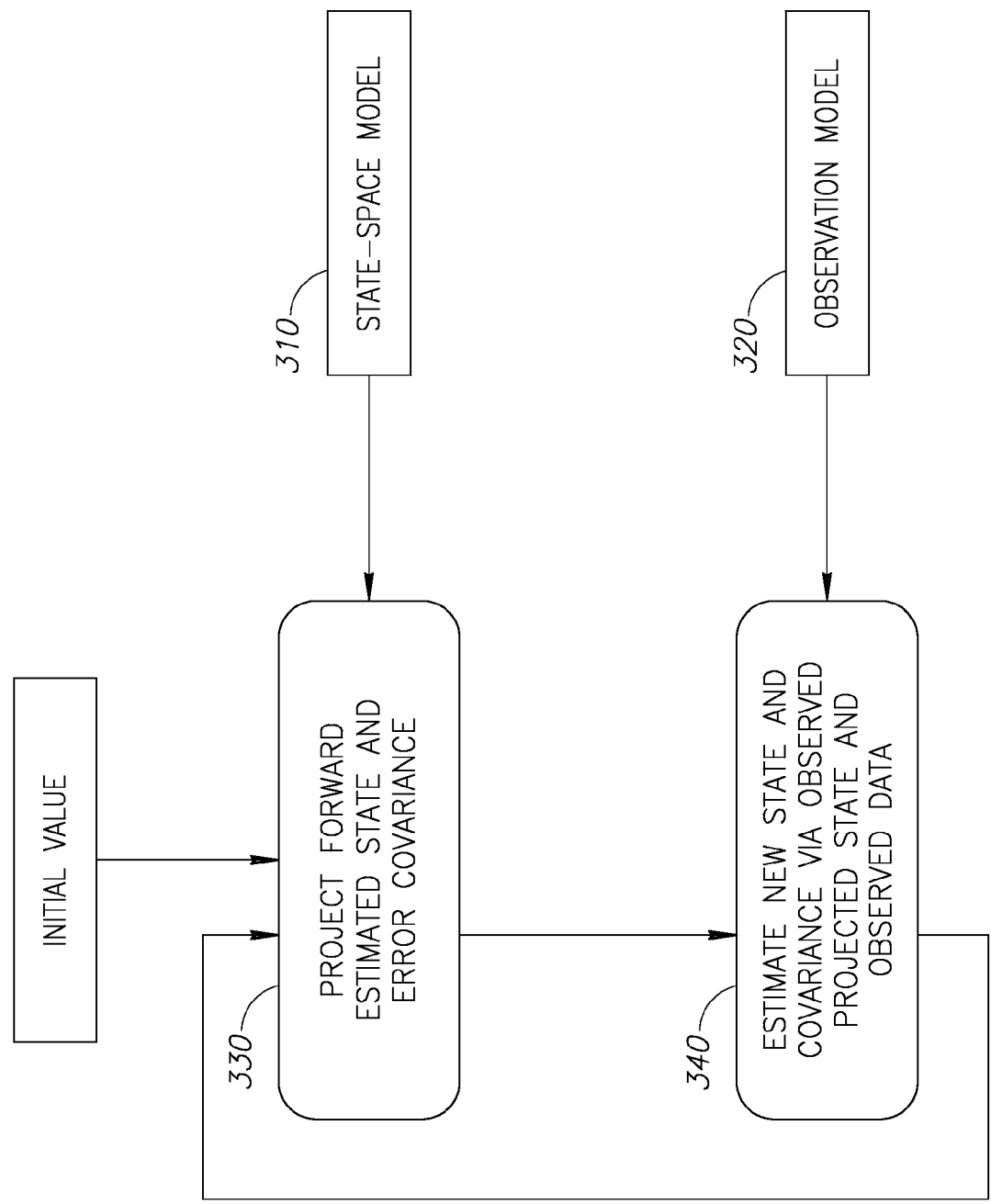
FIG. 4 is a high level flowchart illustrating the logical flow of the Kalman filter, according to some embodiments of the invention.

FIG. 4 is a high level flowchart illustrating the logical flow of the Kalman filter, according to some embodiments of the invention. The interferometry processing algorithm is based on the Unscented Kalman filter to unwrap the interferometric phases.

The Kalman filter and all its derivatives employ a prediction/correction structure based on a state-space model 310 and an observation model 320 to estimate the true state (340) of the measured variable (the interferometric phase in this case). It also incorporates noise into the state-space model as well as the observation model. By this, the data are treated as measurements of a hidden random process of a state variable.

The function $f$ describes state-space model 310 in terms of:

$t_i$: $i_{th}$ time step, i=0, . . . , n−1.
$x_i$=x($t_i$): State of the $i_{th}$ time step to be estimated.
$u_i$=u($t_i$): known input of the $i_{th}$ time step.
$\omega_i$=$\omega$($t_i$): driving error covariance of the $i_{th}$ time step.

$$x_i = f(x_{i-1}, u_{i-1}, \omega_{i-1}) \quad \text{Equation 4}$$

The function h describes observation model 320 in terms of:

$z_i$=z($t_i$): given measurements of the $i_{th}$ time step
$v_i$=v($t_i$): driving error covariance of the $i_{th}$ time step $$z_i = h(z_i, v_i) \quad \text{Equation 5}$$

The original Kalman filter assumes that the state-space model and the observation model are linear and the noise is Gaussian with zero mean.

In the Unscented Kalman filter, these assumptions are relaxed and it allows nonlinear functions f and h. The predicted error covariance is approximated as a Gaussian density by a set of deterministically chosen sample points. These are projected forward (330) by state-space model 310 and describe the estimated mean and covariance.

For our case, the state to be estimated is the unwrapped interferometric phase. The observations of this state are the two parts of the complex interferogram, the real and the imaginary part. Observation model 320:

$$z_i = (\cos(x_i), \sin(x_i)) \quad \text{Equation 6}$$

The state-space model 310 is the linearization of the phase, so the "known" inputs are the phase gradients. State-space model 310:

$$x_i = x_{i-1} + u_{i-1} \quad u_{i-1} = \dot{x}_{i-1} \quad \text{Equation 7}$$

The gradients of the true phase are not known exactly. They are estimated out of the noisy measured data.

Figure 5:
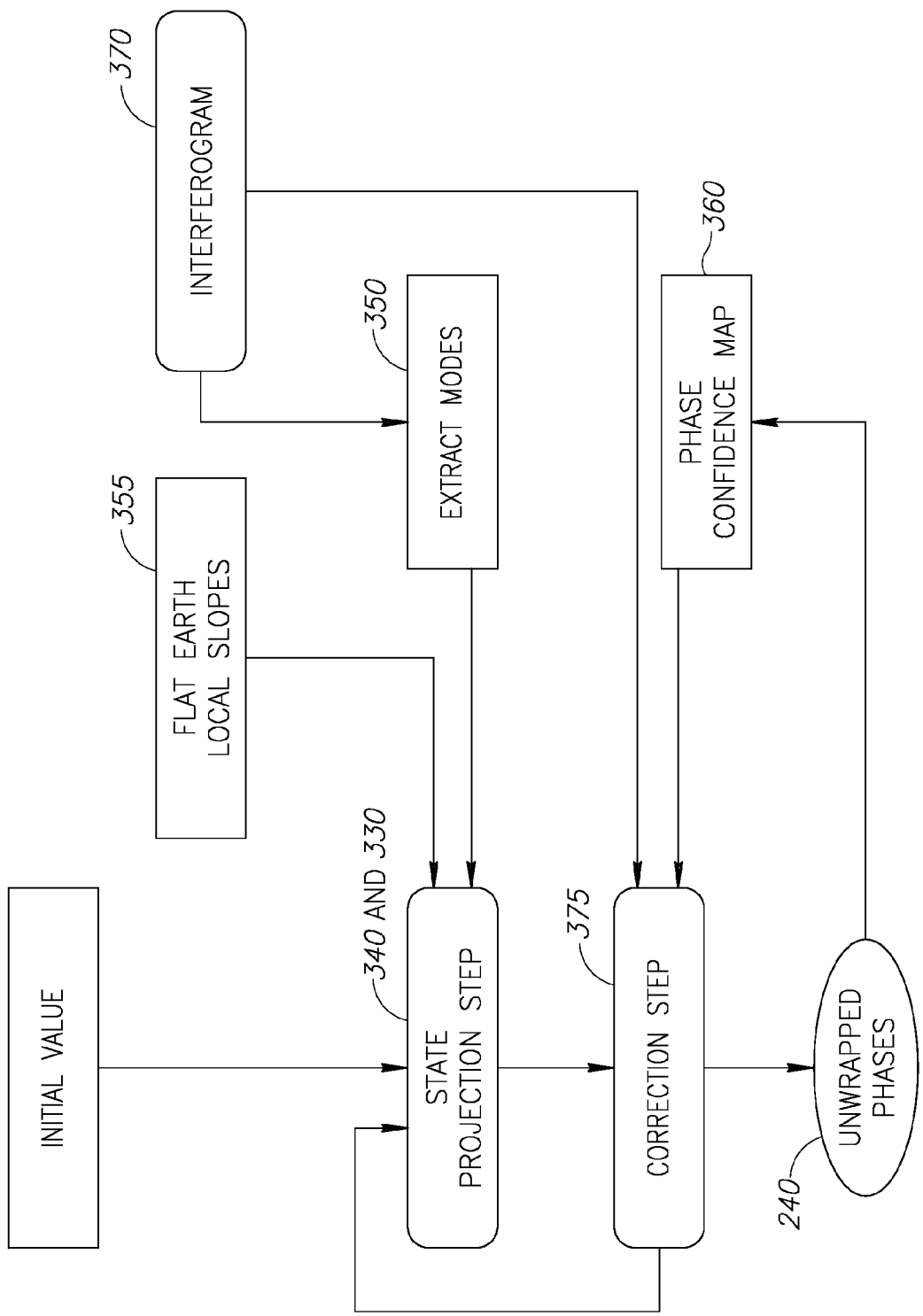
FIG. 5 is a high level flowchart illustrating the logical flow of the Kalman filtering step of the algorithm, according to some embodiments of the invention.

Mode extraction (350, FIG. 5). The phase gradients can be observed as frequency shift of the autocorrelation function of the interferogram (370, FIG. 5). For a time interval of length $T = t_i - t_{i-1}$ the interferogram s is: s(t)=a(t)·exp(−2iπ·φ(t)), with a phase function φ and an amplitude function a.

This can be rewritten as:

$$s(t) = a(t) \cdot \exp\left\{-2i\pi \cdot \left(\varphi(t_0) + \int_{t_0}^{t} \dot{\varphi}(\tau) d\tau\right)\right\} \quad \text{Equation 8}$$

-continued
$$= a(t) \cdot \exp\left\{-2i\pi \cdot \left(\varphi(t_0) + f_0 \cdot (t - t_0) + \int_{t_0}^{t} f(\tau) d\tau\right)\right\}$$
$$=: y(t) \cdot \exp\{-2i\pi \cdot f_0 \cdot (t - t_0)\}$$

The integral part is a dynamic frequency variation. The linear part describes the mean phase slope with a constant frequency $f_0$.

Autocorrelating the signal gives:

$$\begin{aligned} corr_{ss}(\tau) &= E\{s(t) \cdot s(t + \tau)\} \\ &= E\{y(t) \cdot \exp\{-2i\pi \cdot f_0 \cdot (t - t_0)\} \cdot \overline{y}(t + \tau) \cdot \\ &\quad \exp\{2i\pi \cdot f_0 \cdot (t + \tau - t_0)\}\} \\ &= E\{y(t) \cdot \exp\{2i\pi \cdot f_0 \cdot \tau\}\} \\ &= corr_{yy} \cdot \exp\{2i\pi \cdot f_0 \cdot \tau\} \end{aligned} \quad \text{Equation 9}$$

The power spectral density of the signal, therefore, can be seen as a time shifted version of the power spectral density of the function y. If the power spectral density is unimodal and approximately symmetric, the frequency $f_0$ can be extracted as the mode of the power spectral density.

With the normalized power spectral density, we can also extract the spectral bandwidth $\sigma_f$ of the signal as the second central moment, which relates to the driving error covariance via $\omega = (2\pi \cdot T)^2 \cdot \sigma_f^2$.

FIG. 5 is a high level flowchart illustrating the logical flow of the Kalman filtering step of the algorithm, according to some embodiments of the invention.

The extracted modes 350 are bound by the bandwidth of the system. If the spectral bandwidth, and thus the driving error covariance are too high, extracted modes 350 are not reliable, due to wrap around effects of the Fast Fourier Transform (FFT).

In this case, the phase gradients would be replaced by the local slope 355 of the true interferometric phases corresponding to the flat earth signal. These can be pre-generated out of the current position and antenna pointing information of the flying platform (e.g., a helicopter).

As modes 350 are extracted from the noisy data, the real phase gradients are only estimated by modes 350. Wrong modes can lead the filter to insert wrong 2π-phase jumps into the estimated phase, which must be corrected.

Out of the previously computed flat earth true interferometric phases and the forward projected known phases, a map of offsets is generated which give the integer multiple of π of the phase corresponding to every time step. This is called the phase confidence map 360. If the integer multiple of π of the estimated interferometric phase deviates more than 2π off offset map 260 corresponding to the flat earth signal and the projected phases, the difference between the two will be added (correction 375). By this, we can bind the estimated interferometric phase to a realistic height profile.

Figure 6:
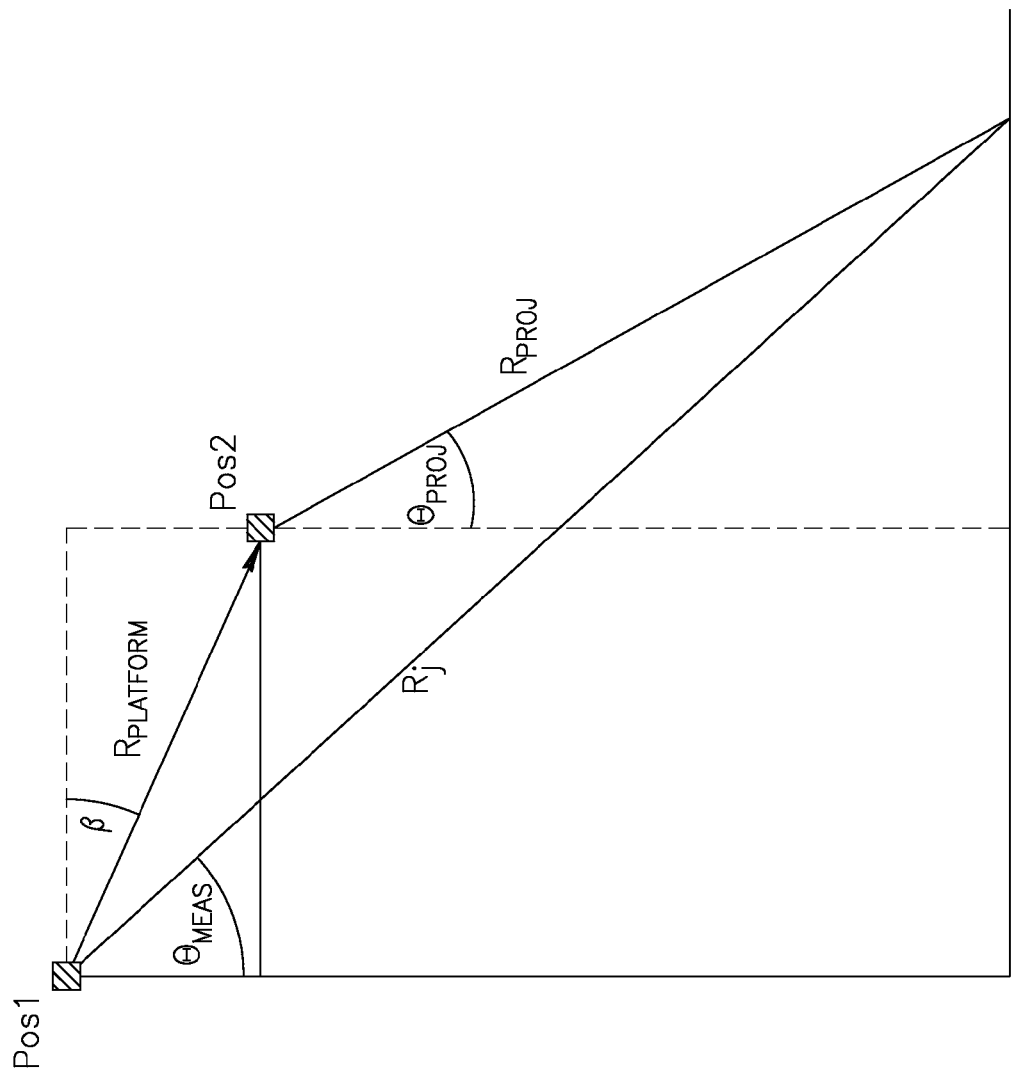
FIG. 6 is a high level schematic illustration of the geometry for phase forward projection, according to some embodiments of the invention.

FIG. 6 is a high level schematic illustration of the geometry for phase forward projection, according to some embodiments of the invention. In the near field geometry, high and steep objects 80 lead to height-ambiguity problems (2π jumps) whereas the phase of the same object in far range can be unwrapped without problems. To make use of this behavior the phase forward projection was introduced.

As an initializing step the flat earth phase is used.

Descending angle β and distance $R_{Platform}$ are known from platform movement. Off-nadir angles $\Theta_{meas}$ are calculated from unwrapped phases, using the following formula:

$$\Theta_{meas} = a\sin\left[\frac{\left(R_i - \frac{\varphi_{unwrapped} \cdot \lambda}{2 \cdot \pi}\right)^2 - R_i^2 - B^2}{-2 \cdot R_i \cdot B}\right] + \zeta \quad \text{Equation 10}$$

where:

$\Theta_{meas}$ is the measured off-nadir angles; $\varphi_{unwrapped}$ is the unwrapped phase; λ is the wavelength; ζ is the angle of baseline from horizon; $R_i$ is the slant range sampling; and B is the baseline length.

The forward projected range can be calculated by:

$$R_{proj} = \sqrt{R_{Platform}^2 + R_i^2 - 2 \cdot R_{Platform} \cdot R_i \cdot \cos(90° - \beta - \Theta_{meas})} \quad \text{Equation 11}$$

and then the forward projected off-nadir angles by:

$$\Theta_{proj} = a\cos\left[\frac{R_i^2 - R_{Platform}^2 - R_{proj}^2}{-2 \cdot R_{Platform} \cdot R_{proj}}\right] - \beta - 90° \quad \text{Equation 12}$$

By solving Equation 10 for the unwrapped phases φ and replacing $\Theta_{meas}$ and Ri with $\Theta_{proj}$ and $R_{proj}$, we get the forward projected phases that have to be resampled and interpolated to the current slant range sampling.

Using the forward projected phases, phase confidence map 360 can be calculated by:

$$PhaseConfidenceMap = \frac{\varphi_{proj}}{abs(\varphi_{proj})} \cdot round\left(\frac{abs(\varphi_{proj})}{\pi}\right) \quad \text{Equation 13}$$

This phase confidence map 360 then is used during Kalman filtering to track phase jumps introduced by the topography or objects 80.

To summarize, the objective of the algorithm is to derive a 3D model of a scene under a Radar 100 rotating around a vertical axis transmitting with one antenna 120 and receiving the echoes with two antennas 130, 140 located at different height positions. The two antennas 130, 140 receive the echoes of the terrain and process a 3D model out of them based on a one dimensional interferometric principle.

The new algorithm for this processing makes use of known procedures from two dimensional interferometric processing and applies it to the one dimensional case that is often mentioned in the literature as reference for the two dimensional case, but was never realized in its original form. The one dimensional interferometric processing suffers from effects (ambiguities, phase unwrapping uncertainties, etc.) which can easily be solved in the two dimensional case, but need new procedures to be solved in the one dimensional one.

The method takes the complex echoes 135, 145 in digital form. After preprocessing of the single echoes for reduction of noise and statistical fluctuations (speckle), an appropriate filtering allows the evaluation of the height of each reflection point on ground from the phase difference in the echo data. The problem of phase confidence is solved by Kalman filtering and applying a feedback loop for phase forward projection and generation of a phase confidence map for further use in the Kalman filtering process.

The algorithm uses a Kalman filter for phase unwrapping. The platform's position, velocity and attitude are used for estimating phase signals of the illuminated scene after each radar cycle. A phase forward projection 330 for each new ($t_k$) phase signal is estimated in respect to the position, velocity and attitude of the platform at the current ($t_k$) and at the former ($t_{k-1}$) radar cycle. Phase confidence map 360 is generated using the phase forward projection 330. Phase confidence map 360 is further used to solve ambiguity effects and uncertainties created by noise in the signals. The estimated phases from previous scans are used to update and correct the results of phase unwrapping during the Kalman filter process. The corrected phases are used together to generate a three dimensional position determination of radar reflections from the surface leading to the three dimensional terrain model.

Figure 7A:
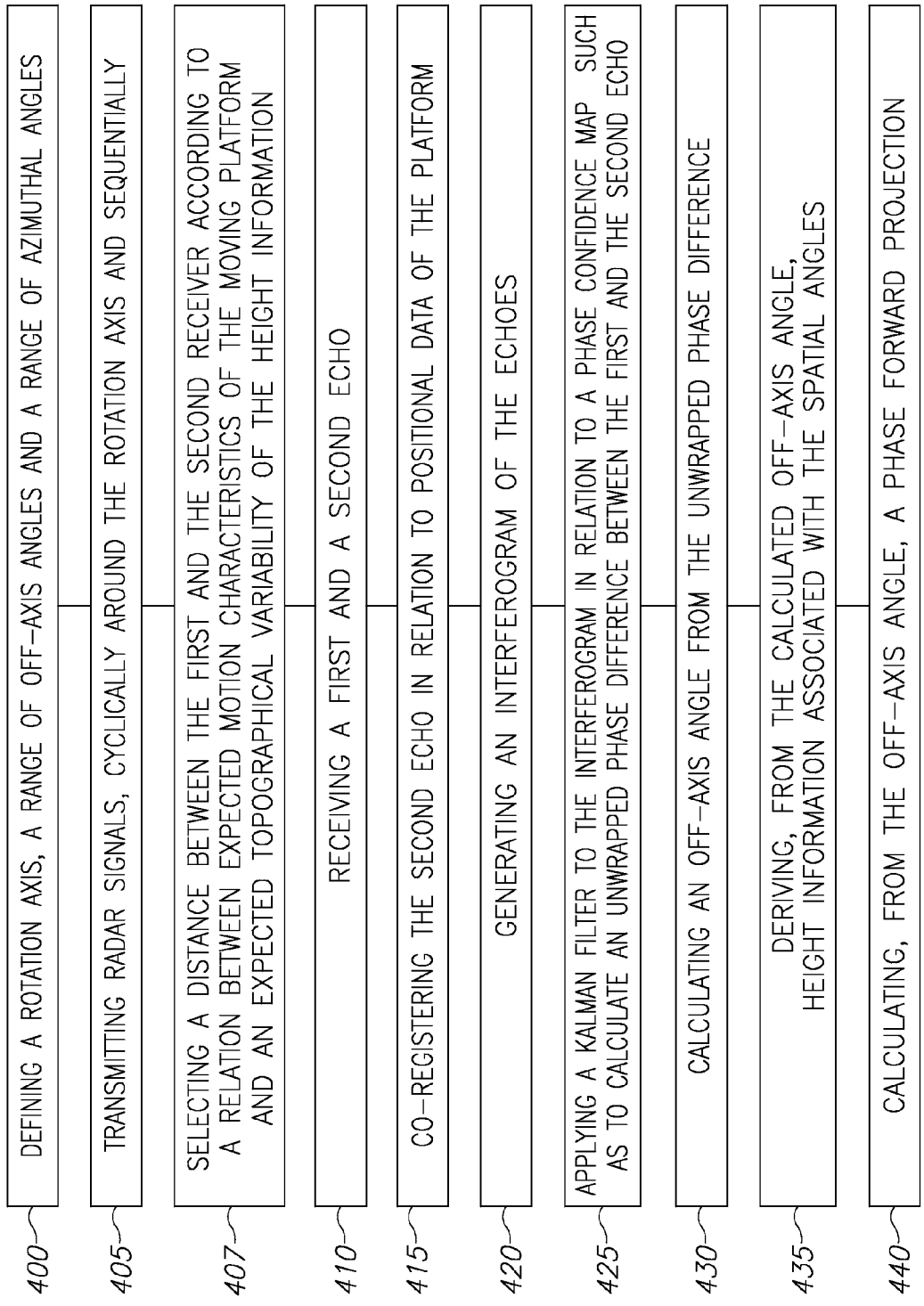
FIGS. 7A and 7B are flowcharts illustrating the method, according to some embodiments of the invention.
Figure 7B:
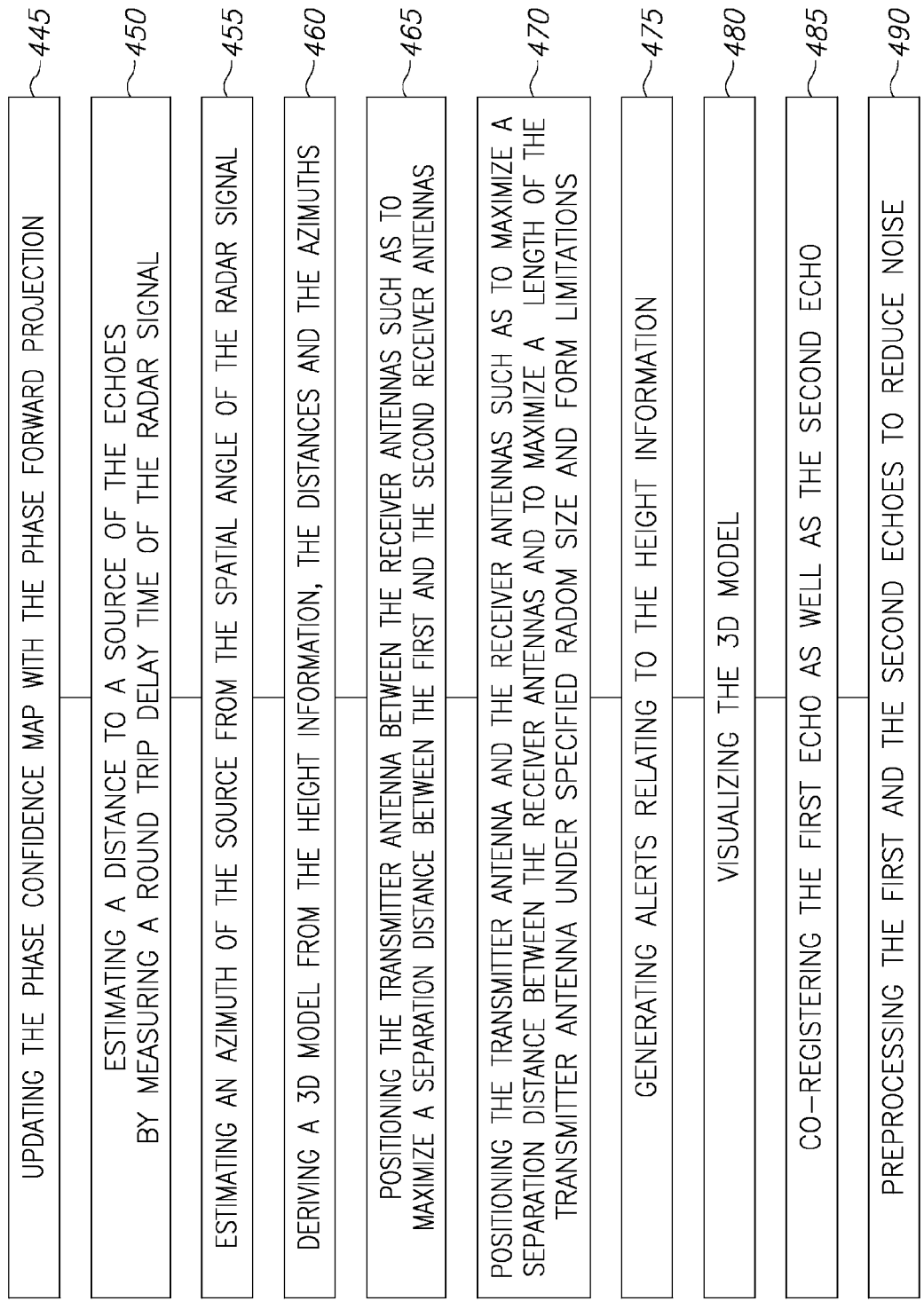

FIGS. 7A and 7B are flowcharts illustrating the method, according to some embodiments of the invention. The method comprises the following stages: defining a rotation axis in respect to a moving platform, a range of off-axis angles in respect to the rotation axis, and a range of azimuth angles, in respect to the rotation axis (stage 400); transmitting, cyclically around the rotation axis and sequentially such as to cover a 360° azimuth angle around the rotation axis, a plurality of radar signals, each having a spatial angle comprising the range of off-axis angles and the range of azimuth angles (stage 405). For substantially each radar signal: receiving a first and a second echo (stage 410); co-registering the second echo in relation to positional data of the platform (stage 415); generating an interferogram of the first echo and the co-registered second echo (stage 420); applying a Kalman filter to the interferogram in relation to a phase confidence map such as to calculate an unwrapped phase difference between the first and the second echo (stage 425); calculating an off-axis angle from the unwrapped phase difference (stage 430); deriving, from the calculated off-axis angle, height information associated with the corresponding spatial angle of the radar signal (stage 435) (e.g., derivation may be completed during a single cycle of the transmitter antenna); calculating, from the off-axis angle, a phase forward projection (stage 440); and updating the phase confidence map with the phase forward projection (stage 445).

The phase confidence map is initially generated for each spatial angle from a specified surface model, and sequentially updated every cycle in relation to the current cycle phase forward projection and to phase forward projections of former cycles, relating to the radar signals of each spatial angle, and considering the platform movement from cycle to cycle.

In some embodiments, the method may further comprise, for substantially each radar signal, the following stages: estimating a distance to a source of the echoes by measuring a round trip delay time of the radar signal (stage 450); estimating an azimuth of the source from the spatial angle of the radar signal (stage 455); and deriving a three dimensional (3D) model from the height information, the distances and the azimuths (stage 460).

The transmitter antenna and the first and second receiver antennas may be aligned such that the interferogram is one dimensional (1D).

The moving platform may be a flying platform, the rotation axis is a nadir axis, and the derived 3D model is of a landscape below the flying platform.

In some embodiments, the method may further comprise positioning the transmitter antenna between the receiver antennas such as to maximize a separation distance between the first and the second receiver antennas (stage 465) and/or positioning the transmitter antenna and the receiver antennas such as to maximize a separation distance between the receiver antennas and to maximize a length of the transmitter antenna under specified RADOM size and form limitations (stage 470).

Figure 3:
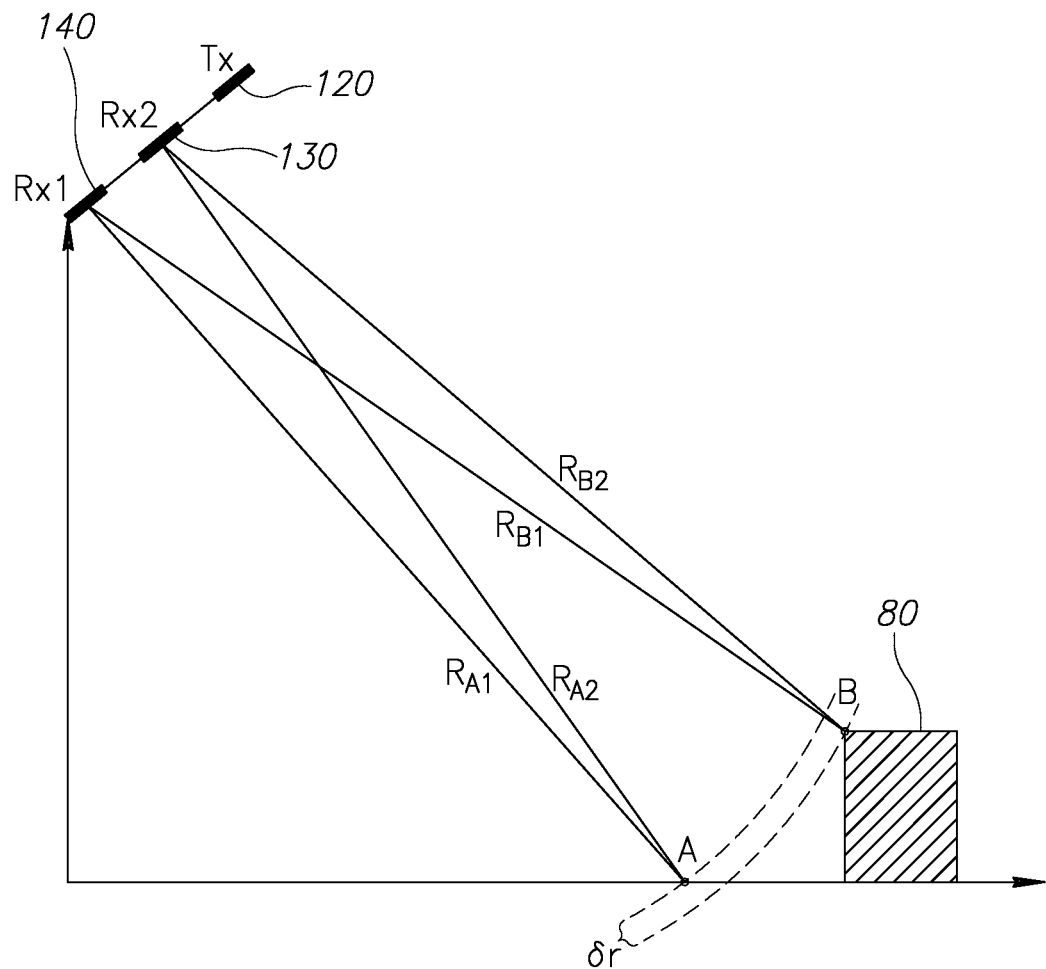
FIG. 3 is a high level schematic illustration of the maximum allowed phase differences from one range cell to the other due to changes in topography, according to some embodiments of the invention.

In some embodiments, the method may further comprise selecting a distance between the first and the second receiver (receiving the first and the second echo 410 being carried out by a first and a second receiver antenna respectively) according to a relation between expected motion characteristics of the moving platform and an expected topographical variability of the height information stage 407, see FIG. 3).

In some embodiments, the method may further comprise generating alerts relating to the height information (stage 475), e.g., alerts from nearing objects 80 (FIG. 3). The method may further comprise visualizing the 3D model (stage 480).

In some embodiments, the method may further comprise preprocessing the first and the second echoes after receiving them to reduce noise and statistical fluctuations (stage 490), and co-registering the first echo as well as the second echo and wherein the interferogram is generated from the co-registered first and second echo (stage 485).

The procedure compensates for movements of the flying platform by using information from a navigation unit measuring the speed vector and the attitude of the platform. This new method allows generating a terrain model within one cycle of the antenna assembly azimuth rotation and improves the accuracy of this model with every new rotation cycle lasting in the order of a few seconds, for example.

Advantageously, in some embodiments, the invention satisfies the need for a Helicopter Flight and Landing Radar (Heli-FLR) to assist pilots in avoiding potential hazards for helicopter safety during flight phase (such as terrain, antennas, trees and even wires), in various weather conditions during day and night, and furthermore, to provide near-real time information of the landing area (such as obstacles, inclined terrain, holes) during the landing phase. The invention uses an advanced one dimensional innovative interferometric method and intuitive visualization. Landing and flight modes may be combined into a light weight and low cost radar-based system. This new system may prevent accidents and casualties and improve the service of helicopter operation companies by increasing the flight capabilities in difficult conditions and the availability of the helicopters.

In some embodiments, the system is able to detect obstacles such as terrain, trees, antennas, wires, etc., in flight mode up to 2000 m thus providing the pilot 30 seconds alert prior to the collision (even in degraded weather conditions, the system may still provide and alert at least 10 seconds ahead). In landing mode, the system may be effective from 500 feet (150 meters), detect obstacles and holes with a resolution of 30 cm during the approach as well as measuring the slope angle in the landing area. The angular coverage of detecting obstacles in the landing area may be 360 degrees with a refresh rate lower than 2 seconds. The information may be presented to the pilot on a multi-function display in an intuitive human factors concept to allow a reduction of pilot workload and enhancing situational awareness. Vocal alerts may inform the pilot in case of danger.

During landing mode, the radar system may realize a 360° mapping of the terrain below the helicopter. High elevation beamwidth of the antennas may guarantee coverage of large areas. The inventors have discovered that the 3D-mapping is exceptionally well realized by transmitting a 36 GHz signal through one antenna 120 and receiving the return from two different other antennas 130, 140. This frequency allows using the interferometric methods with minimal hardware component size. A one dimensional interferometric data-processing may then permit to retrieve the information from the signals 135, 145.

According to another embodiment of the present invention, the processor may be further arranged to: validate the height information by investigating the received echo and detecting strong scatterers, using this to mask noise or possible shadow areas with unreliable height information, and updating the phase confidence map with only validated information; and interpolate and/or extrapolate the phase confidence map to areas of invalid information.

According to yet another embodiment of the present invention, an additional third receiver antenna may be located above, below, between or at the side of the other antennas, and arranged to receive, for substantially each radar signal, a third echo. The processor may be further configured to use the third echo to generate a second interferogram from the first and third echos and a third interferogram of the second and third echos. Additionally, the processor may be further configured to use the second and third interferogram to validate and refine the unwrapped phase information generated from the first interferogram.

The 3D-mapping may be realized in quasi real-time, during the rotation of the system. A full rotation and therefore the complete landing zone may be covered in less than 2 seconds.

Data-base modeling integrating real-time and pre-loaded information: In traditional data-base systems, the algorithms and the display are based on pre-loaded information which does not allow pilots to view real-time information (such as a new obstacle) on the same system. Innovative algorithms that are implemented in the system allow integration of pre-loaded data (such as Digital Terrain Elevation Data and obstacles) and real-time data. The design concept is based on comparison of each new detected obstacle with the data base and updating it if needed. The integration of the real-time and pre-loaded data shall increase the level of confidence in the real-time data and enhance the situational awareness of the pilots, allowing them to view all the relevant information on the same display.

In recent years, systems have become more sophisticated, and the amount of information needed to be displayed has become enormous. In order to reduce the pilot workload, to enhance situational awareness and to shorten training time, a display combining intuitive symbology, terrain and relevant obstacles information may be implemented based on techniques such as color coding, display complexity reduction and data fusion.

In the above description, an embodiment is an example or implementation of the inventions. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not to be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

The invention claimed is:

1. A radar system comprising:
   a radar unit arranged to rotate around a rotation axis in respect to a moving platform, the radar unit comprising:
   (i) a transmitter antenna arranged to transmit, cyclically around the rotation axis and sequentially such as to cover a 360° azimuth angle around the rotation axis, a plurality of radar signals, each having a spatial angle comprising a range of off-axis angles and a range of azimuth angles; and
   (ii) a first and a second receiver antennas, separated along the rotation axis, and arranged to receive, for substantially each radar signal a first and a second echo, respectively; and a processor connected to the receiver antennas, and arranged to:
      (a) co-register the second echo in relation to positional data of the platform;
      (b) generate an interferogram of the first echo and the co-registered second echo;
      (c) apply a Kalman filter to the interferogram in relation to a phase confidence map such as to calculate an unwrapped phase difference between the first and the second echo;
      (d) calculate an off-axis angle from the unwrapped phase;
      (e) derive, from the calculated off-axis angle, height information associated with the corresponding spatial angle of the radar signal;
      (f) calculate, from the off-axis angle, a phase forward projection; and
      (g) update the phase confidence map with the phase forward projection;
      wherein the processor is arranged to initially generate the phase confidence map for each spatial angle from a specified surface model, and sequentially update the phase confidence map every cycle in relation to the current cycle phase forward projection and to phase forward projections of former cycles, relating to the radar signals of each spatial angle, and considering the platform movement from cycle to cycle,
   wherein the processor is further arranged to:
      (h) validate the height information by investigating the received echo and detecting strong scatterers, using this to mask noise or possible shadow areas with unreliable height information, and updating the phase confidence map with only validated information; and
      (i) interpolate and/or extrapolate the phase confidence map to areas of invalid information.

2. The radar system of claim 1, wherein the moving platform is a flying platform and the rotation axis is vertical to the platform.

3. The radar system of claim 1, wherein the transmitter antenna is positioned between the first and the second receiver antennas, to maximize a separation distance between the first and the second receiver antennas.

4. The radar system of claim 1, wherein the transmitter antenna and the first and second receiver antennas are aligned to yield a one dimensional interferogram.

5. The radar system of claim 1, wherein the transmitter antenna is positioned aside of the first and the second receiver antennas.

6. The radar system of claim 1, wherein the transmitter antenna and the first and the second receiver antennas are fan beams with relatively smaller beams in azimuth and wider beams in elevation, for covering a large area during each rotational scan.

7. The radar system of claim 1, wherein the processor is further arranged to calculate a distance of a reflector from a round trip delay time and an azimuth position of the antennas.

8. The radar system of claim 1, enclosed within a half spherical RADOM.

9. The radar system of claim 8, wherein the transmitter antenna and the receiver antennas are positioned to maximize a separation distance between the receiver antennas and to maximize a length of the transmitter antenna under specified RADOM size and form limitations.

10. The radar system of claim 8, wherein the transmitter antenna is positioned at an upper third of the radar system and one of the receiver antennas is positioned in a lower third of the radar system, and wherein the antennas are configured to minimize the volume of the required spherical RADOM.

11. The radar system of claim 1, further comprising a transmit-receive switch connecting one of the receiver antennas with the transmitter antenna and arranged to route a transmitted signal to the transmitter antenna and a corresponding one of received echoes to the connected receiver antenna.

12. The radar system of claim 1, wherein the transmitter antenna is elongated with a smaller azimuth beamwidth and the receiver antennas are relatively with a larger azimuth beamwidth in respect to the transmitter antenna.

13. The radar system of claim 1, wherein the distance between the receiver antennas is selected according to a relation between expected motion characteristics of the moving platform and an expected topographical variability of the height information.

14. The radar system of claim 1, further comprising an additional third receiver antenna which is located above, below, between or at the side of the other antennas, and arranged to receive, for substantially each radar signal, a third echo.

15. The radar system of claim 14, wherein the processor is further configured to use the third echo to generate a second interferogram from the first and third echos and a third interferogram of the second and third echos.

16. The radar system of claim 15, wherein the processor is further configured to use the second and third interferogram to validate and refine the unwrapped phase information generated from the first interferogram.

17. A method comprising:
defining a rotation axis in respect to a moving platform, a range of off-axis angles in respect to the rotation axis, and a range of azimuth angles, in respect to the rotation axis;
transmitting, cyclically around the rotation axis and sequentially such as to cover a 360° azimuth angle around the rotation axis, a plurality of radar signals, each having a spatial angle comprising the range of off-axis angles and the range of azimuth angles;
for substantially each radar signal:
receiving a first and a second echo;
co-registering the second echo in relation to positional data of the platform;
generating an interferogram of the first echo and the co-registered second echo;
applying a Kalman filter to the interferogram in relation to a phase confidence map such as to calculate an unwrapped phase difference between the first and the second echo;
calculating an off-axis angle from the unwrapped phase difference; deriving, from the calculated off-axis angle, height information associated with the corresponding spatial angle of the radar signal;
calculating, from the off-axis angle, a phase forward projection;
updating the phase confidence map with the phase forward projection;
validating the height information by investigating the received echo and detecting strong scatterers, using this to mask noise or possible shadow areas with unreliable height information, and updating the phase confidence map with only validated information; and
interpolating and/or extrapolating the phase confidence map to areas of invalid information,
wherein the phase confidence map is initially generated for each spatial angle from a specified surface model, and sequentially updated every cycle in relation to the current cycle phase forward projection and to phase forward projections of former cycles, relating to the radar signals of each spatial angle.

18. The method of claim 17, further receiving from an additional third receiver antenna which is located above, below, between or at the side of the other antennas, for substantially each radar signal, a third echo.

19. The method of claim 18, further comprising using the third echo to generate a second interferogram from the first and third echos and a third interferogram of the second and third echos.

20. The method of claim 19, further comprising using the second and third interferogram to validate and refine the unwrapped phase information generated from the first interferogram.

* * * * *